US012784977B2

(12) United States Patent
Lim et al.

(10) Patent No.: US 12,784,977 B2
(45) Date of Patent: Nov. 3, 2026

(54) CERAMIC CAPACITOR AND MANUFACTURING METHOD THEREOF

(71) Applicant: AMOTECH CO., LTD., Incheon (KR)

(72) Inventors: Byungguk Lim, Incheon (KR); Yunsuk Choi, Incheon (KR); Jaeyong Song, Incheon (KR)

(73) Assignee: AMOTECH CO., LTD., Incheon (KR)

( * ) Notice: Subject to any disclaimer, the term of this patent is extended or adjusted under 35 U.S.C. 154(b) by 127 days.

(21) Appl. No.: 18/723,393

(22) PCT Filed: Dec. 1, 2022

(86) PCT No.: PCT/KR2022/019364
§ 371 (c)(1),
(2) Date: Jun. 21, 2024

(87) PCT Pub. No.: WO2023/121044
PCT Pub. Date: Jun. 29, 2023

(65) Prior Publication Data

US 2025/0166900 A1 May 22, 2025

(30) Foreign Application Priority Data

Dec. 22, 2021 (KR) ........................ 10-2021-0184453

(51) Int. Cl.
*H01G 4/30* (2006.01)
*H01G 4/008* (2006.01)
(Continued)

(52) U.S. Cl.
CPC ............. *H01G 4/008* (2013.01); *H01G 4/012* (2013.01); *H01G 4/12* (2013.01); *H01G 4/232* (2013.01); *H01G 4/30* (2013.01)

(58) Field of Classification Search
None
See application file for complete search history.

(56) References Cited

U.S. PATENT DOCUMENTS 4,584,628 A 4/1986 Cichanowski
9,105,400 B2 * 8/2015 Hiramatsu ............. H01G 4/012
(Continued)

FOREIGN PATENT DOCUMENTS

JP 10-050548 A 2/1998
JP 2002170736 A * 6/2002
(Continued)

OTHER PUBLICATIONS

English Machine Translation of JP2002170736 (Year: 2002).*
(Continued)

*Primary Examiner* — Timothy J. Dole
*Assistant Examiner* — Esther N Lian
(74) *Attorney, Agent, or Firm* — Maschoff Brennan

(57) ABSTRACT

The present invention relates to a ceramic capacitor and a manufacturing method thereof, and provides a ceramic capacitor and a manufacturing method thereof, the capacitor comprising: a plurality of dielectric layers; a ceramic body including inner electrodes, some of the inner electrodes being thick; and outer electrodes which are arranged on both cross sections facing each other in the lengthwise direction of the ceramic body, and which are connected to the inner electrodes. The present invention comprises reinforcing parts arranged in areas connected with the outer electrodes on electrode units of the inner electrodes so as to partially reinforce the thickness of the inner electrodes.

10 Claims, 6 Drawing Sheets

(51) Int. Cl.

| | |
|---|---|
| ***H01G 4/012*** | (2006.01) |
| ***H01G 4/12*** | (2006.01) |
| ***H01G 4/232*** | (2006.01) |

(56) References Cited

U.S. PATENT DOCUMENTS

| | | | | |
|---|---|---|---|---|
| 9,111,691 | B2 * | 8/2015 | Hamada | H01G 4/30 |
| 9,496,087 | B2 | 11/2016 | Satou | |
| 10,580,584 | B2 | 3/2020 | Kim et al. | |
| 11,189,423 | B2 * | 11/2021 | Kim | H01G 4/30 |
| 2006/0245141 | A1 * | 11/2006 | Shirasu | H01G 4/012 361/303 |
| 2010/0008017 | A1 * | 1/2010 | Ito | H01G 4/30 361/301.4 |
| 2010/0085682 | A1 * | 4/2010 | Abe | H01G 4/232 29/829 |
| 2016/0020029 | A1 * | 1/2016 | Hirao | H01G 4/012 427/79 |
| 2018/0061577 | A1 * | 3/2018 | Yasuda | H01G 4/0085 |
| 2023/0268122 | A1 | 8/2023 | Ikeda | |

FOREIGN PATENT DOCUMENTS

| | | | |
|---|---|---|---|
| JP | 5960816 | B2 | 8/2016 |
| KR | 10-2019-0001886 | A | 1/2019 |
| KR | 10-2021-0131241 | A | 11/2021 |

OTHER PUBLICATIONS

KR Office Action dated Apr. 9, 2024 as received in Application No. 10-2021-0184453.
KR Office Action dated May 21, 2026 in application No. 10-2025-0207247.

* cited by examiner

[FIG. 1]
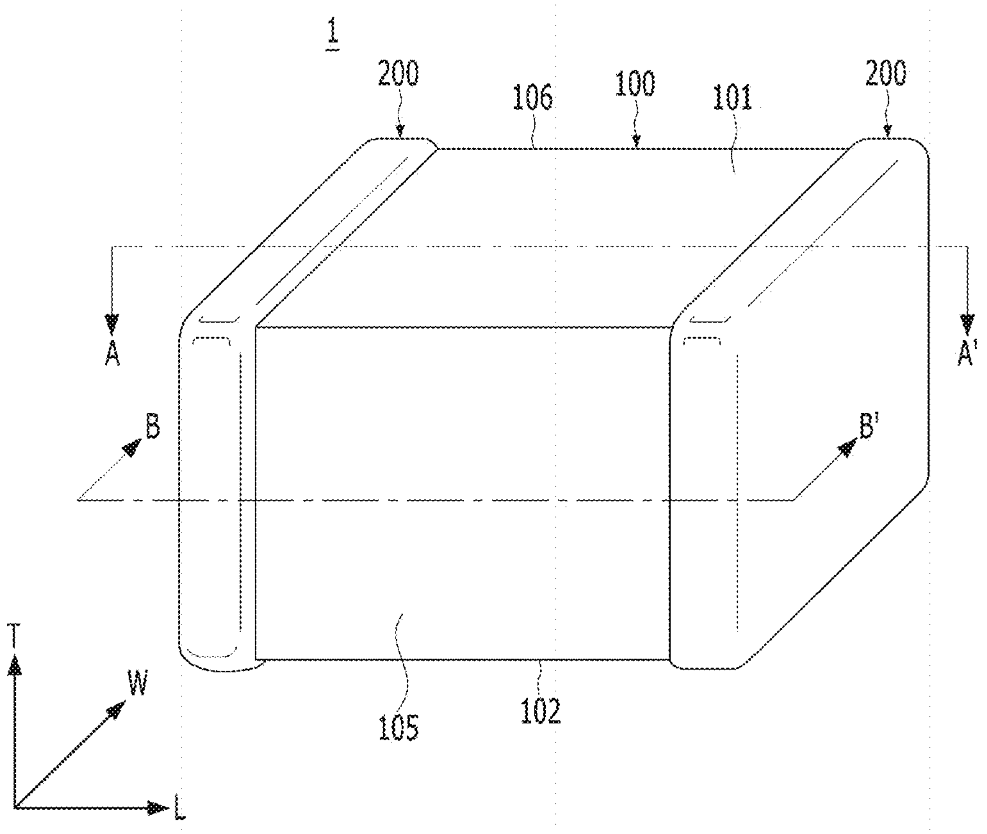

[FIG. 2]
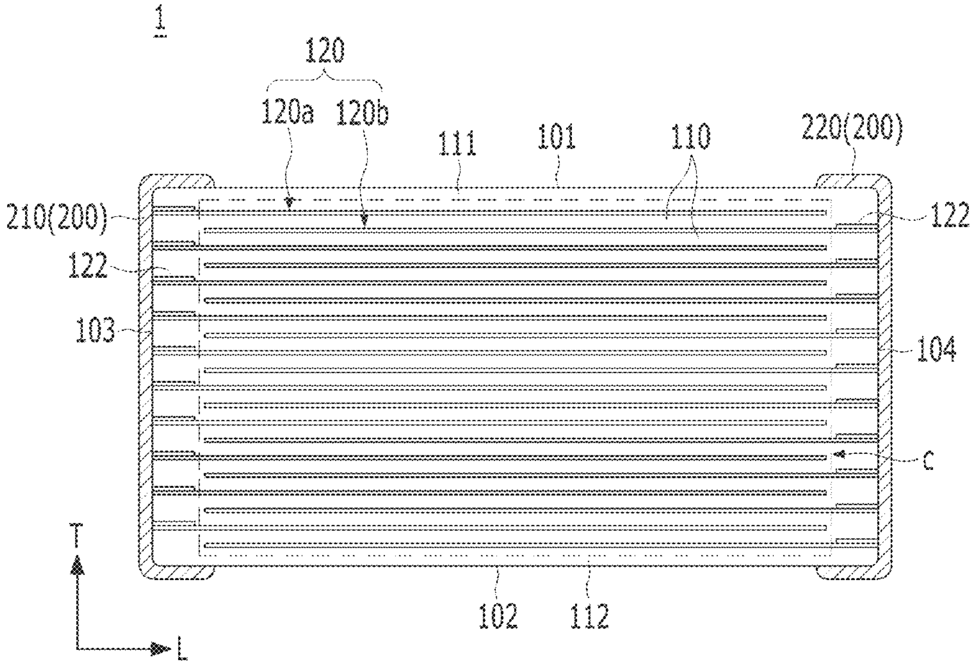

[FIG. 3]
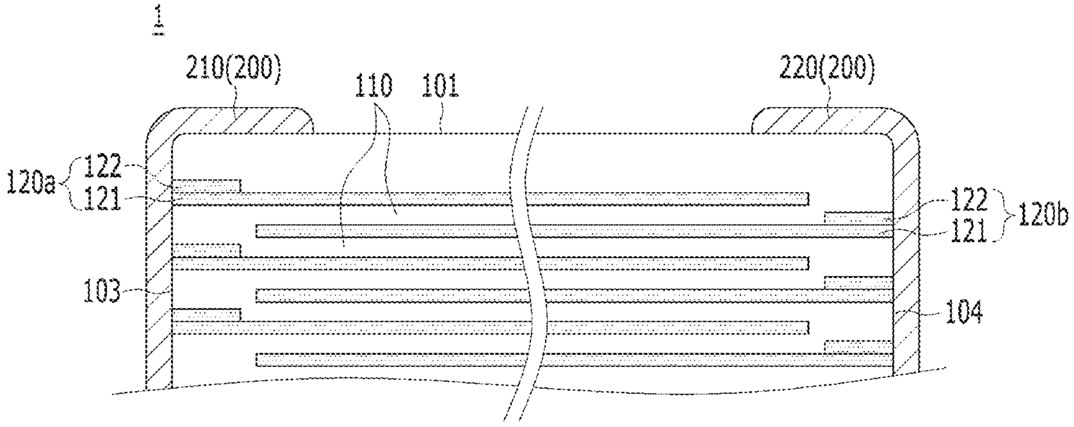
[FIG. 4]
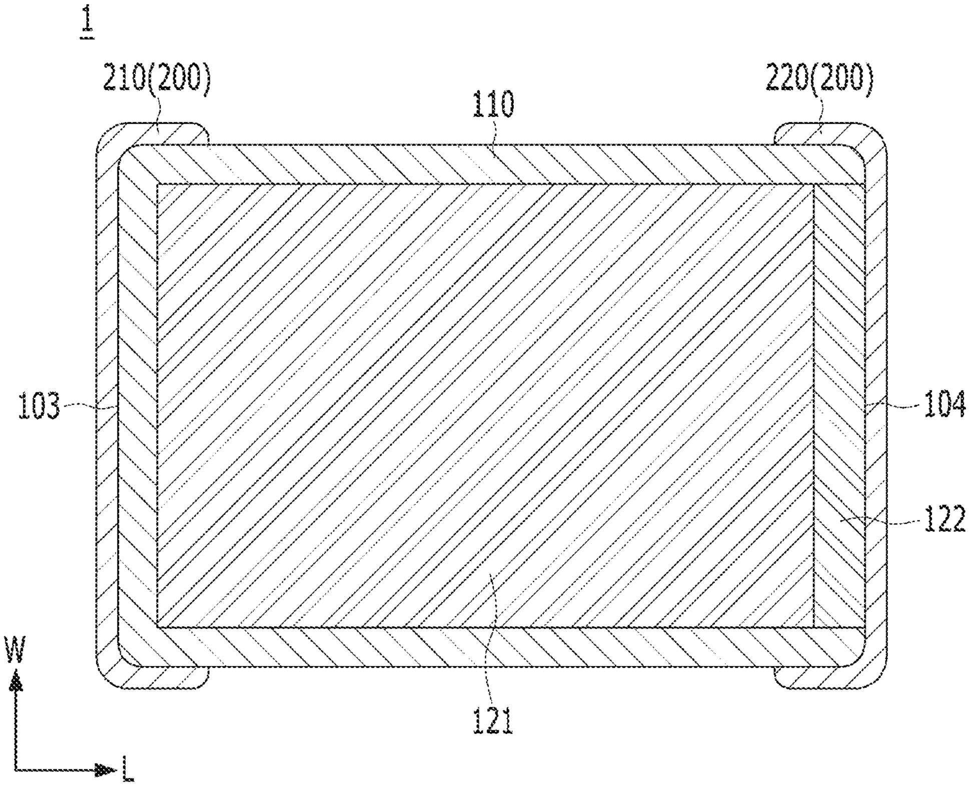

[FIG. 5]
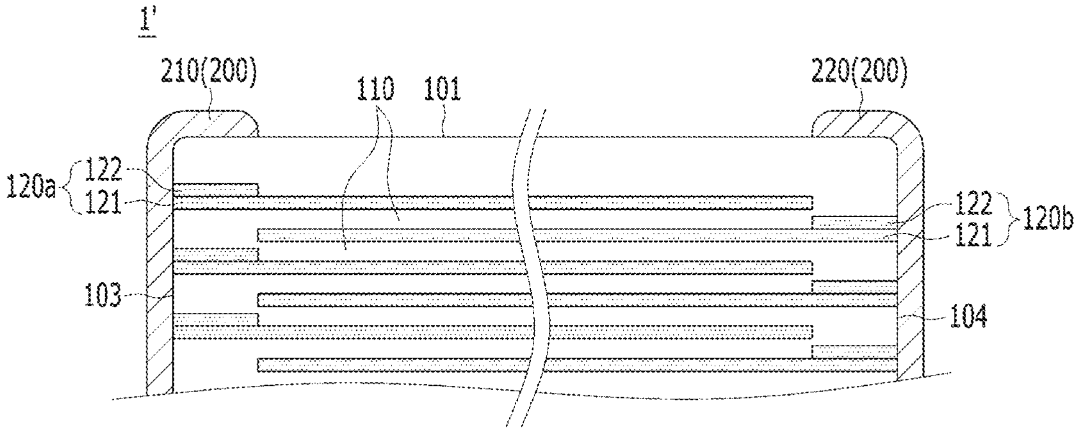
[FIG. 6]
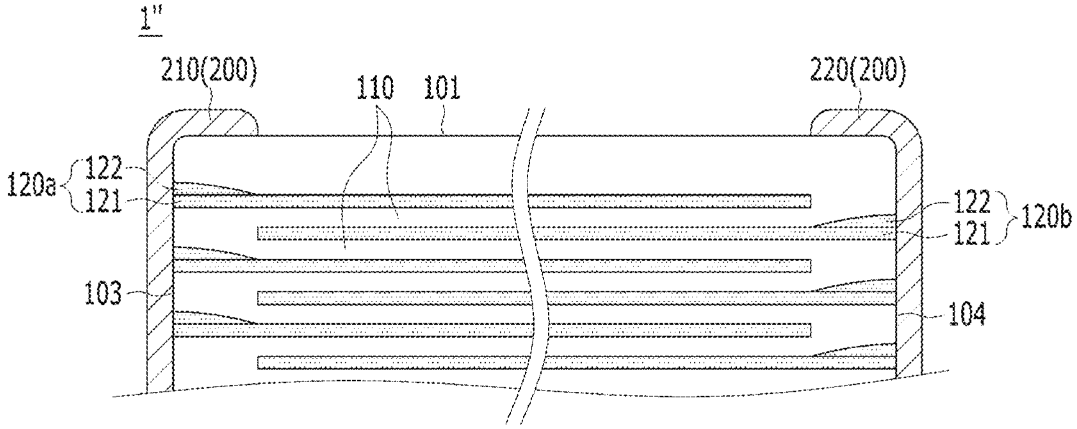

[FIG. 7]
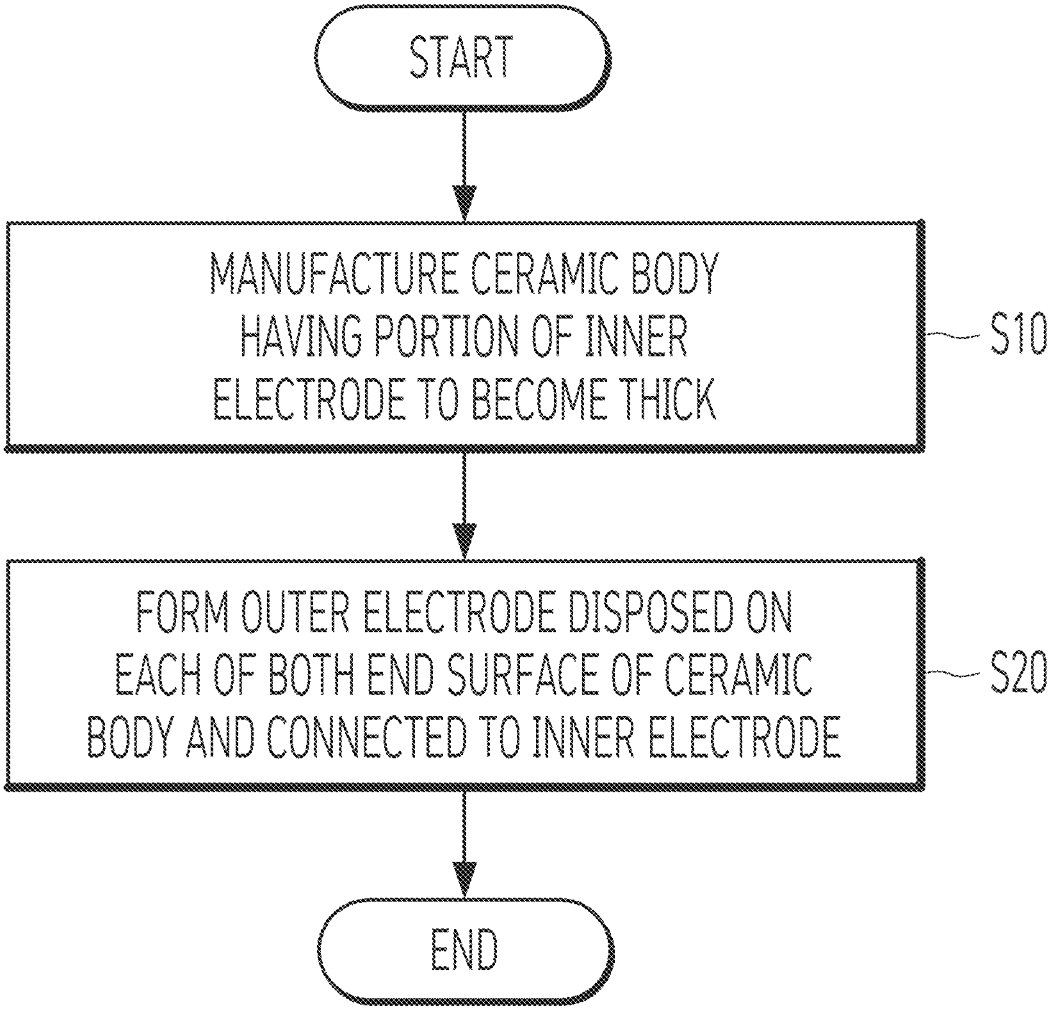

[FIG. 8]
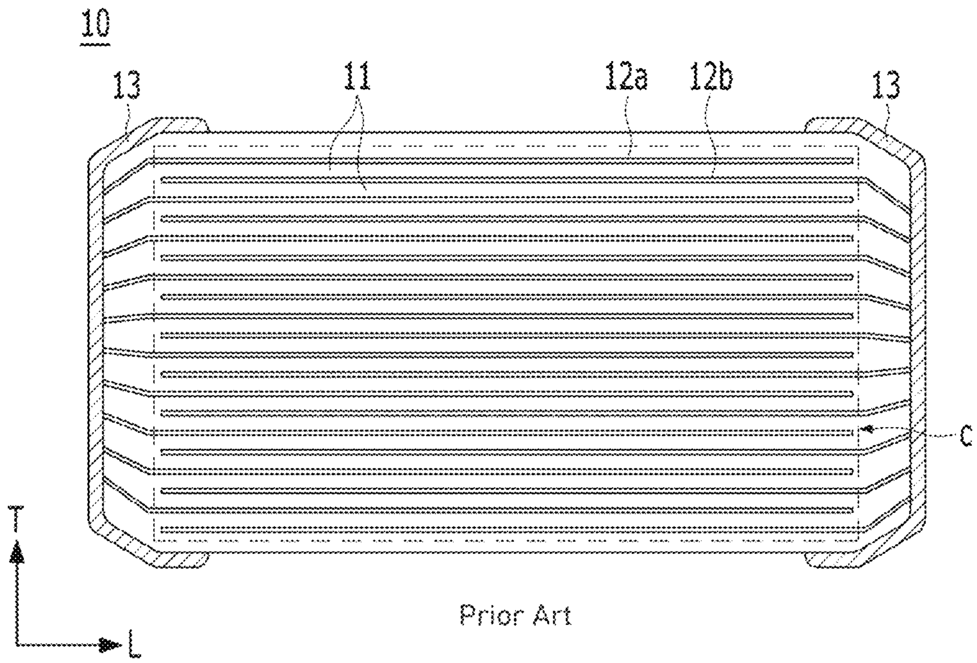
Prior Art

CERAMIC CAPACITOR AND MANUFACTURING METHOD THEREOF

TECHNICAL FIELD

The present disclosure relates to a ceramic capacitor and a manufacturing method thereof, and to a multilayer chip capacitor applied to electronic devices and a manufacturing method thereof.

BACKGROUND ART

Capacitors are used to protect components by storing electricity when there are the components whose voltage needs to be maintained at a constant level and supplying electricity evenly and stably as needed by the components, reduce noise in electronic devices, or pass only an AC signal in a mixture of DC and AC signals.

Recently, as electronic devices have become smaller, lighter, more digital, and have higher frequencies, a multilayer chip capacitor (MLCC) formed by stacking several layers of ceramic as a dielectric between electrodes is being widely used. The MLCC helps electronic devices operate well by removing noise that affects active elements such as semiconductors and ICs in electronic circuits classified into active and passive elements. Noise refers to signals that interfere with operations of the electronic devices.

Referring to FIG. 8, a conventional ceramic capacitor 10 includes a dielectric 11, first and second inner electrodes 12*a* and 12*b*, and an outer electrode 13. The total number of layers of the inner electrode in a capacitor region c in which the first and second inner electrodes 12*a* and 12*b* overlap each other is 20, but the total number of layers of the inner electrode in the remaining regions excluding the capacitor region c in which only the first inner electrodes 12*a* overlap each other or only the second inner electrodes 12*b* overlap each other is 10. As described above, the number of layers of the inner electrode in the capacitor region c is twice the number of layers of the inner electrode in the remaining regions, thereby causing deformation in which the thickness of the capacitor region c is greater than the thickness of the remaining regions.

Matters described above in the background art are intended to help understanding of the background of the disclosure and may include matters not related to the known related art.

SUMMARY OF INVENTION

Technical Problem

The present disclosure has been made in efforts to solve the above problem and is directed to providing a ceramic capacitor capable of preventing deformation of a dielectric layer caused by a larger number of layers of an inner electrode in a capacitor region in which a capacitance is generated, and a manufacturing method thereof.

Solution to Problem

A ceramic capacitor according to the present disclosure for achieving the object may include a ceramic body including a plurality of dielectric layers and an inner electrode and having a portion of the inner electrode formed to become thick, and an outer electrode disposed on each of both end surfaces facing the ceramic body in a longitudinal direction and connected to the inner electrode, wherein the inner electrode may include an electrode part having one end surface disposed in contact with the outer electrode and formed to extend in the longitudinal direction to form a capacitor area facing the inner electrode adjacent in a stacking direction, and a reinforcing part disposed on a connection portion with the outer electrode on the electrode part to partially increase a thickness of the inner electrode.

The reinforcing part may be disposed to overlap the remaining areas excluding the capacitor area of the electrode part.

A thickness of the reinforcing part may be equal to a thickness of the electrode part.

The electrode part and the reinforcing part may include the same metal material.

The reinforcing part may be made of a material having a melting point higher than a material of the electrode part.

The reinforcing part may have one side end aligned with one end surface of the electrode part and vertically located coplanarly with the one end surface.

The reinforcing part may have the other side end formed to extend to a boundary of the capacitor area.

A thickness of the reinforcing part may maintain a curved shape as it moves away from the outer electrode and becomes smaller.

Meanwhile, a method of manufacturing a ceramic capacitor according to one embodiment of the present disclosure may include manufacturing a ceramic body including a plurality of dielectric layers and an inner electrode and having a portion of the inner electrode formed to become thick, and forming an outer electrode disposed on each of both end surfaces facing the ceramic body in a longitudinal direction and connected to the inner electrode, wherein in the manufacturing of the ceramic body, the inner electrode may include an electrode part having one end surface disposed in contact with the outer electrode and formed to extend in the longitudinal direction to form a capacitor area facing the inner electrode adjacent in a stacking direction, and a reinforcing part disposed on a connection portion with the outer electrode on the electrode part to partially increase a thickness of the inner electrode.

In the manufacturing of the ceramic body, the electrode part may be formed by printing or applying a conductive paste including Ag and Ni on at least one surface of a ceramic sheet.

In the manufacturing of the ceramic body, the reinforcing part may be formed by printing or applying the conductive paste in the remaining areas excluding the capacitor area of the electrode part.

In the manufacturing of the ceramic body, the conductive paste of the electrode part and the conductive paste of the reinforcing part may include the same metal material.

In the manufacturing of the ceramic body, the conductive paste of the reinforcing part may be made of a material having a higher melting point than the conductive paste of the electrode part.

Advantageous Effects of Invention

According to the present disclosure, by arranging the reinforcing part in the remaining regions excluding the capacitor region of the electrode part, it is possible to partially increase the thickness of the portion connected to the outer electrode of the inner electrode without affecting the capacitance and reduce the electrical resistance value while stably maintaining the connection state with the outer electrode.

In addition, according to the present disclosure, by forming the reinforcing part on the connection portion of the electrode part and the outer electrode, it is possible to eliminate the thickness difference caused by the fact that the total number of layers of the inner electrode in the ceramic body is different in each region and prevent deformation.

In addition, according to the present disclosure, since the reinforcing part of the inner electrode is made of the material having the melting point higher than that of the material of the electrode part, the sintering temperature of the reinforcing part can be higher than that of the electrode part to cause less shrinkage, and since the gap caused by the difference in sintering shrinkage between the dielectric layer and the inner electrode can be reduced, thereby stably maintaining the connection state between the inner electrode and the outer electrode.

In addition, according to the present disclosure, by arranging the reinforcing part to cover all of the remaining portions excluding the portion corresponding to the capacitor region of the inner electrode, it is possible to maximally increase the region in which the thickness is increased by the reinforcing part, thereby increasing the electrical resistance reduction effect and reinforcing the step between the electrode part and the reinforcing part adjacent to each other in the stacking direction.

In addition, according to the present disclosure, by forming the reinforcing part to be gradually thinner while maintaining the curved shape, it is possible to remove the corner portion on which stress is concentrated, thereby reducing the possibility of the occurrence of cracks.

BRIEF DESCRIPTION OF DRAWINGS

FIG. 1 is a perspective view showing a ceramic capacitor according to one embodiment of the present disclosure.

FIG. 2 is a cross-sectional view along line A-A' in FIG. 1.

FIG. 3 is an enlarged cross-sectional view of a portion of FIG. 2.

FIG. 4 is a cross-sectional view along line B-B' in FIG. 1.

FIG. 5 is an enlarged cross-sectional view of a portion of a ceramic capacitor according to another embodiment of the present disclosure.

FIG. 6 is an enlarged cross-sectional view of a portion of a ceramic capacitor according to still another embodiment of the present disclosure.

FIG. 7 is a flowchart showing a method of manufacturing the ceramic capacitor according to one embodiment of the present disclosure.

FIG. 8 is a cross-sectional view showing a ceramic capacitor according to the related art.

DESCRIPTION OF EMBODIMENTS

Hereinafter, exemplary embodiments according to the present disclosure will be described in detail with reference to the accompanying drawings.

The embodiments are provided to more completely describe the present disclosure to those skilled in the art, and the following embodiments may be modified in various different forms, and the scope of the present disclosure is not limited to the following embodiments. Rather, the embodiments are provided to make the disclosure more faithful and complete and fully convey the spirit of the present disclosure.

Terms used herein are intended to describe specific embodiments and are not intended to limit the present disclosure. In addition, in the present specification, singular forms may include plural forms unless the context clearly indicates otherwise.

In the description of the embodiment, when each layer (film), area, pattern, or structure is described as being formed "on" or "under" a substrate, each layer (film), area, pad, or patterns, "on" and "under" include both cases of being formed "directly" or "indirectly with other elements interposed therebetween." In addition, in principle, the reference for "above" or "under" each layer are based on the drawing.

The drawings are only intended to help understanding of the spirit of the present disclosure and should not be construed as limiting the scope of the present disclosure by the drawings. In addition, in the drawings, a relative thickness and length, or a relative size may be exaggerated for convenience and clarity of description.

FIG. 1 is a perspective view showing a ceramic capacitor according to one embodiment of the present disclosure, FIG. 2 is a cross-sectional view along line A-A' in FIG. 1, FIG. 3 is an enlarged cross-sectional view of a portion of FIG. 2, and FIG. 4 is a cross-sectional view along line B-B' in FIG. 1, and the drawings are merely intended to understand the spirit of the present disclosure and should not be construed as limiting the scope of the present disclosure by the drawings. In addition, in the drawings, a relative thickness and length, or a relative size may be exaggerated for convenience and clarity of description.

As shown in FIGS. 1 and 2, a ceramic capacitor 1 according to one embodiment of the present disclosure may include a ceramic body 100 and an outer electrode 200.

The ceramic body 100 may include a dielectric layer 110 and an inner electrode 120 alternately stacked with the dielectric layer 110 interposed therebetween. The ceramic body 100 is manufactured by forming the inner electrode 120 on a ceramic sheet made of a dielectric material, stacking the ceramic sheet on which the inner electrode 120 is formed, and pressing and sintering the ceramic sheet, and the dielectric layers 110 adjacent to each other may be integrated to the extent that their boundaries may not be identified.

The ceramic body 100 may have a hexahedral shape or a similar shape. Defining directions for clearly describing embodiments of the present disclosure, L, W, and T shown in FIG. 1 indicate a longitudinal direction, width direction, and thickness direction of the ceramic body 100, respectively.

In the ceramic body 100, a top surface 101 and a bottom surface 102 may disposed to face each other in a stacking direction, that is, in a thickness direction T of the dielectric layer, a first cross section 103 and a second cross section 104 may be disposed to face each other in a longitudinal direction L, and a first side surface 105 and a second side surface 106 may be disposed to face each other in a width direction W.

A material of the dielectric layer 110 may be barium titanate ($BaTiO_3$)-based ceramic having a high dielectric constant. In addition, a dielectric material of the dielectric layer may use or additionally include (Ca, Zr)(Sr, Ti)$O_3$. However, since the capacitance is proportional to the dielectric constant of the dielectric, it is preferable to use $BaTiO_3$ that is the dielectric material having the high dielectric constant.

The inner electrode 120 may include a first inner electrode **120*a* and a second inner electrode 120*b* that face and overlap each other with the dielectric layer 110 interposed therebetween, and a portion of each of the first and second inner electrodes 120***a* and 120*b* may be formed to have a greater thickness due to a reinforcing part 122 disposed on a connection portion of the outer electrode 200 on an electrode part 121. The electrode part 121 and the reinforcing part 122 will be described in detail below with reference to FIGS. 3 and 4.

The first and second inner electrodes 120*a* and 120*b* are electrodes having different polarities and may be consecutively stacked in the thickness direction of the ceramic body 100. The inner electrodes 120*a* and 120*b* may be formed by printing or applying the material of the inner electrodes 120*a* and 120*b* to at least one surface of a ceramic sheet made of a dielectric material. For example, the first and second inner electrodes 120*a* and 120*b* may be formed by printing or applying a conductive paste containing at least one of Cu, Ag, Pd, Pt, Au, and Ni on at least one surface of the ceramic sheet. Preferably, the first and second inner electrodes 120*a* and 120*b* may be formed by printing or applying the conductive paste containing one of Ag and Ni, which are materials that may withstand high temperatures.

In addition, the ceramic sheet may be manufactured through a molding process in which dielectric material powder, additive materials, etc. are uniformly mixed to create a slurry, and then the slurry is uniformly coated on a film.

As shown in FIG. 2, the first and second inner electrodes 120*a* and 120*b* may be disposed to be alternately exposed through the first cross section 103 and the second cross section 104 with the dielectric layer 110 interposed therebetween in the ceramic body 100. Here, the first and second inner electrodes 120*a* and 120*b* may be electrically insulated by the dielectric layer 110 disposed therebetween and may form a capacitor region c that is a region facing the inner electrodes adjacent to each other in a stacking direction. The capacitor region c is a portion in which a capacitance is generated, and the capacitance is proportional to areas of the first and second inner electrodes 120*a* and 120*b* overlapping each other in the stacking direction T.

The ceramic body 100 may include an upper dielectric layer 111 disposed above the capacitor region c, and a lower dielectric layer 112 disposed under the capacitor region c in a cross section in the thickness direction. Unlike the dielectric layer 110 disposed between the first inner electrode 120*a* and the second inner electrode 120*b*, the upper dielectric layer 111 and the lower dielectric layer 112 may be formed of at least one ceramic sheet not coated with a conductive paste for forming the inner electrode.

The outer electrode 200 may be disposed on each of the cross sections 103 and 104 in a longitudinal direction of the ceramic body 100 and connected to the inner electrode 120. Here, when the outer electrode disposed on the first cross section 103 is defined as a first outer electrode 210 and the outer electrode disposed on the second cross section 104 is defined as a second outer electrode 220, the first inner electrode 120*a* may be connected to the first outer electrode 210, and the second inner electrode 120*b* may be connected to the second outer electrode 220.

The outer electrode 200 may be formed by directly transferring the conductive paste on each of the first and second cross sections 103 and 104 and portions of perimetric surfaces of an edge adjacent to each of the first and second cross sections 103 and 104, that is, perimetric surfaces including the top surface 101, the bottom surface 102, a first side surface 105, and a second side surface 106 using a wheel. A termination method using a wheel has an advantage that the conductive paste may be transferred thinly or thickly by adjusting a pressure of the wheel using an elastic wheel, thereby making it easy to adjust the thickness.

Although not shown, the outer electrode 200 may be formed of a plurality of layers (not shown). As an example, the plurality of layers forming the second outer electrode 220 may have the form that is in contact with each of the first and second inner electrodes 120*a* and 120*b* exposed through the first cross section 103 and the second cross section 104 of the ceramic body 100 and has a first layer containing Cu, a second layer containing an Ag epoxy, and a third layer containing Ni or Sn that are sequentially stacked. In this case, since the Ag epoxy contained in the second layer is a conductive material having flexibility and elasticity, it is effective in preventing cracks by serving as a cushion for mitigating an impact in an environment having a large stress change.

Referring to FIG. 3, the inner electrodes 120*a* and 120*b* may include the electrode part 121 and the reinforcing part 122.

The electrode part 121 may be disposed so that one end surface is in contact with the outer electrode 200 and formed to extend in the longitudinal direction of the ceramic body 100. The electrode part 121 forms the capacitor region c facing the inner electrodes adjacent to each other in the stacking direction when the inner electrodes 120*a* and 120*b* are stacked, and in this case, the capacitance of the capacitor is proportional to areas of the electrode parts 121 overlapping each other.

The electrode part 121 may be made of a material that may withstand high temperatures. As an example, the electrode part 121 may be formed by printing or applying the conductive paste containing at least one of Cu, Ag, Pd, Pt, Au, and Ni. Preferably, the electrode part 121 may be formed by printing or applying the conductive paste containing one of Ag and Ni, which are materials that may withstand high temperatures.

The reinforcing part 122 may be disposed at a connection portion with the outer electrode 200 on the electrode part 121 to partially increase the thicknesses of the inner electrodes 120*a* and 120*b*.

One side end of the reinforcing part 122 may be aligned with one end surface of the electrode part 121 and located perpendicularly on the same line as the one side end of the electrode part 121. In addition, the reinforcing part 122 may be disposed to overlap the remaining regions excluding the capacitor region c of the electrode part 121. Since the reinforcing part 122 may partially increase the thicknesses of the portions connected to the outer electrode 200 of the inner electrodes 120*a* and 120*b* without affecting the capacitance, it is possible to reduce the electrical resistance value while stably maintaining the connection state with the outer electrode 200.

In addition, the reinforcing part 122 can reduce deformation of the dielectric layer 110 caused by the fact that the number of layers of the inner electrode 120 is different in each region. As shown in FIG. 8, the conventional ceramic capacitor 10 has a total of 20 inner electrode layers in the capacitor area c in which the first inner electrode 12*a* and the second inner electrode 12*b* overlap each other, but in the remaining areas excluding the capacitor area c, but since only the first inner electrodes 12*a* or only the second inner electrodes 12*b* overlap each other, a total of 10 inner electrode layers are present. As described above, the number of layers of the inner electrode in the capacitor region c is twice the number of layers of the inner electrode in the remaining regions, thereby causing deformation in which the thickness of the capacitor region c is greater than the thickness of the remaining regions.

On the other hand, as shown in FIGS. 2 to 4, the present disclosure can prevent deformation of the dielectric layer 110 by forming the reinforcing part 122 at the connection portion between the electrode part 121 and the outer electrode 200. That is, since the total number of layers of the electrode part 121 and the reinforcing part 122 in the remaining areas excluding the capacitor area c is 20, a total of 20 layers of inner electrodes may be present like the capacitor area c. Therefore, according to the present disclosure, it is possible to prevent thickness deformation caused by a larger number of layers of the inner electrode in the capacitor area c, and thus a portion of the dielectric layer 110 is not deformed, and the ceramic body 100 may be manufactured in a state of being flat-stacked.

The thickness of the reinforcing part 122 of each of the first and second inner electrodes 120*a* and 120*b* may be formed to be the same as the thickness of the electrode part 121. Since the reinforcing part 122 is intended to cancel a difference in thickness due to the different number of layers of the inner electrode for each area, when the reinforcing part 122 is formed to have the same thickness as the electrode part 121, the number of layers and the thickness of the inner electrode are the same, and thus it is more effective to prevent deformation.

The electrode part 121 and the reinforcing part 122 may include the same metal material. For example, when the electrode part 121 includes Ni, the reinforcing part 122 may also include Ni like the electrode part 121.

Alternatively, the reinforcing part 122 may be made of a material having a melting point higher than the material of the electrode part 121. For example, when the electrode part 121 is made of an Ag material having about 960° C. of a melting point, the reinforcing part 122 may be made of an AgPd material having 1000° C. or higher of a melting point. For example, the reinforcing part 122 may be made of an AgPd material containing 65 to 75% by volume of Ag and 25 to 35% by volume of Pd. When the volume percentage of Pd in AgPd is too high, there is a disadvantage in that resistance increases, and thus it is preferable that Pd is included at a ratio within the above range.

In the manufacturing process of the ceramic body 100, since the dielectric layer 110 made of a ceramic material and the inner electrode 120 made of a metal material have different sintering shrinkage behavior during the sintering process, a gap between the dielectric layer 110 and the inner electrode 120 are formed after sintering. Therefore, in the process of forming the outer electrode 200, there may be problems that a plating solution, moisture, etc. permeates the gap, thereby degrading insulation, and moisture remaining in the gap expands as heat is applied in the mounting process on a circuit board.

On the other hand, when the reinforcing part 122 of the inner electrode is made of a material having a melting point higher than the material of the electrode part 121, a sintering temperature of the reinforcing part 122 is higher than that of the electrode part 121, resulting in less shrinkage during sintering. That is, the gap formed due to a difference in sintering shrinkage behavior of the dielectric layer 110 and the inner electrode 120 can be reduced, and a connection state between the inner electrode 120 and the outer electrode 200 can be maintained stably.

FIG. 5 is an enlarged cross-sectional view of a portion of a ceramic capacitor according to another embodiment of the present disclosure.

As shown in FIG. 5, in a ceramic capacitor 1' according to another embodiment of the present disclosure, the reinforcing part 122 of each of the inner electrodes 120*a* and 120*b* may have one side end aligned on the one end surface of the electrode part 121 and vertically located coplanarly with the one end surface of the electrode part 121 and the other side end formed to extend to the boundary of the capacitor area c. As described above, when the reinforcing part 122 is disposed to cover all the remaining portions excluding the portion corresponding to the capacitor area c of each of the inner electrodes 120*a* and 120*b*, since a portion having a thickness increased by the reinforcing part 122 is increased more than the ceramic capacitor 1 according to one embodiment of the present disclosure, it is possible to increase the electrical resistance reduction effect and to reduce the deformation of the dielectric layer 110 due to the different number of layers of the inner electrode by reinforcing a step between the electrode part 121 and the reinforcing part 122 that are adjacent in the stacking direction.

FIG. 6 is an enlarged cross-sectional view of a portion of a ceramic capacitor according to still another embodiment of the present disclosure.

As shown in FIG. 6, in a ceramic capacitor 1" according to still another embodiment of the present disclosure, the reinforcing part 122 of each of the inner electrodes 120*a* and 120*b* may be formed to become gradually thinner while maintaining a curved shape as it moves away from the outer electrode 200. In this case, the reinforcing part 122 may be formed to have one side end aligned with the one end surface of the electrode part 121 and vertically located coplanarly with the one end surface of the electrode part 121 and the other side end extending to the boundary of the capacitor area c. As described above, when the reinforcing part 122 is formed to become gradually thinner while maintaining the curved shape, the possibility of the occurrence of cracks can be reduced by eliminating corner portions in which stress is concentrated. The curved shape of the reinforcing part 122 may be formed by surface tension by adjusting the viscosity of the conductive paste.

FIG. 7 is a flowchart showing a method of manufacturing the ceramic capacitor according to one embodiment of the present disclosure.

As shown in FIG. 8, the method of manufacturing the ceramic capacitor according to one embodiment of the present disclosure may include manufacturing the ceramic body including the plurality of dielectric layers 110 and the inner electrode 120 and having a portion of the inner electrode 120 formed to become thick (S10), and forming the outer electrode 200 disposed on each of both end surfaces 103 and 104 facing the ceramic body 100 in the longitudinal direction and connected to the inner electrode 120 (S20).

In the manufacturing of the ceramic body (S10), the inner electrodes 120*a* and 120*b* may be formed to include the electrode part 121 and the reinforcing part 122. Here, the electrode part 121 may be disposed to have one end surface in contact with the outer electrode 200 and formed to extend in the longitudinal direction to form the capacitor area c that faces the inner electrodes 120*a* and 120*b* adjacent in the stacking direction. The reinforcing part 122 may be disposed at a connection portion with the outer electrode 200 on the electrode part 121 to partially increase the thicknesses of the inner electrodes 120*a* and 120*b*.

In the manufacturing of the ceramic body (S10), the electrode part 121 may be formed by printing or applying a conductive paste containing at least one of Cu, Ag, Pd, Pt, Au, and Ni on at least one surface of the ceramic sheet. Preferably, the electrode part 121 may be formed by printing or applying the conductive paste containing one of Ag and Ni, which are materials that may withstand high temperatures.

In addition, in the manufacturing of the ceramic body (S10), the reinforcing part 122 may be formed by printing or applying conductive paste to the remaining area of the electrode part 121 excluding the capacitor area c. Since the reinforcing part 122 may be disposed on the connection portion with the outer electrode 200 on the electrode part 121 without affecting the capacitance to partially increase the thicknesses of the inner electrodes 120*a* and 120*b*, it is possible to stably maintain the connection state with the outer electrode 200 and reduce the electrical resistance value.

In addition, in the conventional ceramic capacitor, since the number of layers of the inner electrode in the capacitor area c in which the first inner electrode 12*a* and the second inner electrode 12*b* overlap each other in the ceramic body 100 differs from the number of layers of the inner electrode excluding the capacitor area c in the remaining areas, deformation in which the thickness of the capacitor area c becomes greater than the thicknesses of the remaining areas may occur. On the other hand, in the ceramic capacitor according to the present disclosure, since the thickness difference due to the different number of layers of the inner electrode may be canceled by forming the reinforcing part 122 on the connection portion of the electrode part 121 and the outer electrode 200, it is effective to prevent deformation.

In the manufacturing of the ceramic body (S10), the conductive paste of the electrode part 121 and the conductive paste of the reinforcing part 122 may include the same metal material. For example, when the electrode part 121 includes Ni, the reinforcing part 122 may also include Ni like the electrode part 121.

Alternatively, in the manufacturing of the ceramic body (S10), the material of the conductive paste of the reinforcing part 122 may be made of a material having a melting point higher than the material of the conductive paste of the electrode part 121. For example, when the electrode part 121 is made of an Ag material having about 960° C. of a melting point, the reinforcing part 122 may be made of an AgPd material having 1000° C. or higher of a melting point. As described above, when the reinforcing part 122 of the inner electrode is made of a material having a melting point higher than the material of the electrode part 121, a sintering temperature of the reinforcing part 122 is higher than that of the electrode part 121, resulting in less shrinkage during sintering. That is, the gap formed due to a difference in sintering shrinkage behavior of the dielectric layer 110 and the inner electrode 120 can be reduced, and a connection state between the inner electrode 120 and the outer electrode 200 can be maintained stably.

In the forming of the outer electrode 200 (S20), the outer electrode 200 may be formed by directly transferring the conductive paste on each of the first and second cross sections 103 and 104 and portions of perimetric surfaces of an edge adjacent to each of the first and second cross sections 103 and 104, that is, perimetric surfaces including the top surface 101, the bottom surface 102, the first side surface 105, and the second side surface 106 using the wheel. A termination method using a wheel has an advantage that the conductive paste may be transferred thinly or thickly by adjusting a pressure of the wheel using an elastic wheel, thereby making it easy to adjust the thickness.

The above-described embodiments of the present disclosure may be easily applied to high-frequency and low-capacitance ceramic capacitors, and although the embodiments have been carried out by being separated into one embodiment, another embodiment, and still another embodiment, the embodiments can be applied in combination.

The above description is merely the exemplary description of the technical spirit of the present disclosure, and those skilled in the art to which the present disclosure pertains will be able to variously modify and change the present disclosure without departing from the essential characteristics of the present disclosure. Therefore, the embodiments disclosed in the present disclosure are not intended to limit the technical spirit of the present disclosure, but intended to describe the same, and the scope of the technical spirit of the present disclosure is not limited by these embodiments. The scope of the present disclosure should be construed according to the appended claims, and all technical spirits within the equivalent range should be construed as being included in the scope of the present disclosure.

The invention claimed is:

1. A ceramic capacitor comprising:

a ceramic body including a plurality of dielectric layers and a plurality of inner electrodes and having a portion of the inner electrode formed to become thick; and an outer electrode disposed on each of both end surfaces facing the ceramic body in a longitudinal direction and connected to the inner electrode, wherein the inner electrode includes:

an electrode part having one end surface disposed in contact with the outer electrode and formed to extend in the longitudinal direction, wherein the electrode part includes a capacitor area facing the inner electrode adjacent in a stacking direction and a remaining area excluding the capacitor area; and a reinforcing part disposed to overlap the remaining area on a connection portion with the outer electrode on the electrode part to partially increase a thickness of the inner electrode, wherein a thickness of the reinforcing part is equal to a thickness of the electrode part.

2. The ceramic capacitor of claim 1, wherein the electrode part and the reinforcing part include the same metal material.

3. The ceramic capacitor of claim 1, wherein the reinforcing part is made of a material having a melting point higher than a material of the electrode part.

4. The ceramic capacitor of claim 1, wherein the reinforcing part has one side end aligned with one end surface of the electrode part and vertically located coplanarly with the one end surface.

5. The ceramic capacitor of claim 4, wherein the reinforcing part has the other side end formed to extend to a boundary of the capacitor area.

6. A method of manufacturing a ceramic capacitor, comprising:

manufacturing a ceramic body including a plurality of dielectric layers and a plurality of inner electrode and having a portion of the inner electrode formed to become thick; and forming an outer electrode disposed on each of both end surfaces facing the ceramic body in a longitudinal direction and connected to the inner electrode, wherein in the manufacturing of the ceramic body, the inner electrode includes:

an electrode part having one end surface disposed in contact with the outer electrode and formed to extend in the longitudinal direction to form a capacitor area facing the inner electrode adjacent in a stacking direction; and a reinforcing part disposed to overlap the remaining area on a connection portion with the outer electrode on the electrode part to partially increase a thickness of the inner electrode, wherein a thickness of the reinforcing part is equal to a thickness of the electrode part.

7. The method of claim 6, wherein in the manufacturing of the ceramic body, the electrode part is formed by printing or applying a conductive paste including Ag and Ni on at least one surface of a ceramic sheet.

8. The method of claim 7, wherein in the manufacturing of the ceramic body, the reinforcing part is formed by printing or applying the conductive paste in the remaining areas excluding the capacitor area of the electrode part.

9. The method of claim 8, wherein in the manufacturing of the ceramic body, the conductive paste of the electrode part and the conductive paste of the reinforcing part include the same metal material.

10. The method of claim 8, wherein in the manufacturing of the ceramic body, the conductive paste of the reinforcing part is made of a material having a higher melting point than the conductive paste of the electrode part.

* * * * *